Dec. 5, 1961 D. MITCHELL 3,012,100

TELEPHONE PRIVACY SYSTEM

Filed April 24, 1943 2 Sheets-Sheet 1

INVENTOR
D. MITCHELL
BY H. A. Burgess
ATTORNEY

TELEPHONE PRIVACY SYSTEM

Filed April 24, 1943 2 Sheets-Sheet 2

INVENTOR
D. MITCHELL
BY H. A. Burgess
ATTORNEY

3,012,100

TELEPHONE PRIVACY SYSTEM

Doren Mitchell, Bound Brook, N.J., assignor to Bell Telephone Laboratories, Incorporated, New York, N.Y., a corporation of New York Filed Apr. 24, 1943, Ser. No. 484,363
6 Claims. (Cl. 179—1.5)

The present invention relates to signaling systems in which use is made of telegraphone apparatus for recording or reproducing impulses or waves. Typical of such a system is a privacy system in which a telegraphone is used for introducing variable transmission delay in signals for transmission or reception. The invention will be disclosed as embodied in a telephone privacy system in which a magnetic tape is used for delay purposes and the same electromagnets are used alternatively for recording and reproducing.

One problem that arises in such a system is that of applying a suitable bias current to the electromagnets when they are to serve as recorders and to remove the bias at other times. One of the objects of this invention is to provide for such bias supply.

In addition to variable time delay, a telegraphone can also be used to introduce other signal masking or disguising effects and it is a further object of this invention to provide a modifying control of the recording or reproducing electromagnets for such purpose.

These and other objects and features of the invention will appear more fully from the following detailed description of a complete two-way telephone privacy system embodying the invention in illustrative form, and from the accompanying drawing in which.

The invention will be described as embodied in a telephone privacy system of the type disclosed and claimed in a copending and concurrently issued application of Busch et al., Serial No. 484,362, filed April 24, 1943, and because of the full disclosure given in that application only an abbreviated description of the system as a whole need be given in this application to form the setting for a disclosure of the present invention.

In the Busch et al. system use is made of a traveling magnetic tape to introduce different amounts of transmission delay in the speech together with a commutator or distributor for breaking the speech up into short fragments; also a set of code relays and a scrambler are used for so controlling the connections between the magnetic tape storage apparatus and line that the order in which the speech fragments are sent (or received) is continuously changing.

Figure 1:
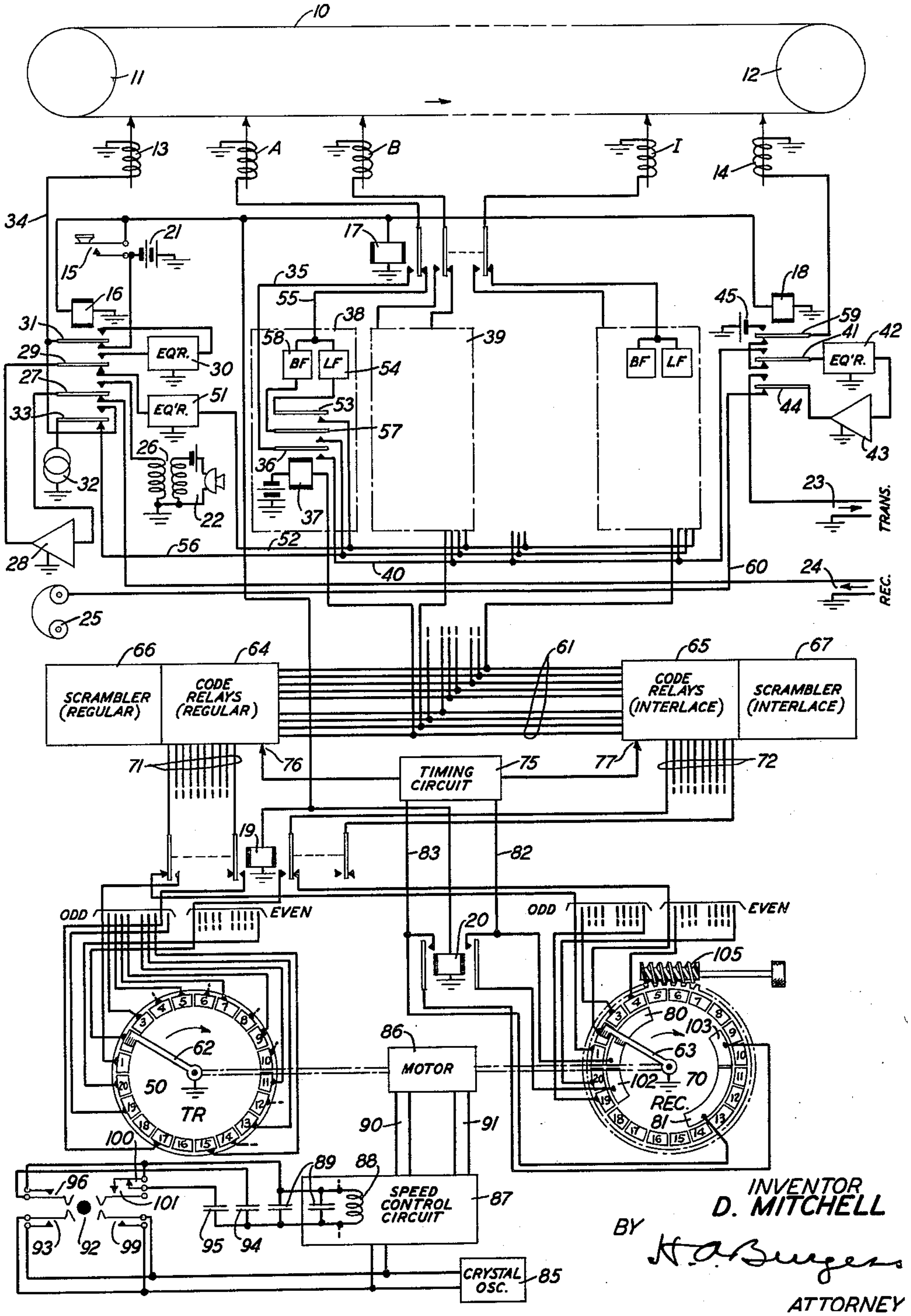
FIG. 1 is a simplified schematic circuit diagram of one terminal of a two-way telephone privacy system.

Referring to FIG. 1, the magnetic tape is shown at 10 passing over the two pulleys 11 and 12 in the direction of the arrow, moving in succession past a recording coil 13, nine recorder-reproducer coils A, B, etc. to I, and a final reproducer coil 14, these coils being equally spaced along the tape. (For brevity, the coils C to H are omitted from the drawing.)

The key 15, which would ordinarily be associated with the handset, is pushed during the talking condition and released in the listening condition. When the key 15 is depressed the relays 16, 17, 18, 19, and 20 are all energized from the battery 21. Speech spoken into the microphone 22 may then be transmitted through the privacy system to transmitting line 23 appearing at the right of the figure. Conversely, in the listening condition, with the key 15 open secret speech received over the line 24 is transmitted through the privacy apparatus and is heard in the telephones 25. Tracing through, first, the path taken by the waves in the transmitting condition with the key 15 closed and, therefore, with the relays 16 to 20 energized, the speech waves generated in the microphone circuit 22 are transmitted through repeating coil 26, front contact and armature 27 of relay 16, amplifier 28, front contact and armature 29 of relay 16, equalizer 30, front contact and armature 31 of relay 16 to the recorder coil 13. At this same time high frequency current having a frequency of, for example, 20 kilocycles produced in generator 32 is transmitted over front contact and armature 33 of relay 16 and over conductor 34 to the winding of recorder magnet 13. The application of this high frequency wave, together with the speech wave to the winding of recorder coil 13, insures the efficient recording of the speech, the high frequency wave serving as a bias for, in effect, straightening out the B-H cycle through which the speech drives the magnetic material of which the tape 10 is composed into a substantially straight line characteristic, thereby reducing the distortion that would be produced if the B-H loop traversed by the speech variations enclosed a considerable area.

The recorded speech waves on the tape travel toward the right and are picked up on the various coils A, B, etc. acting as reproducer coils. Each of these coils is connected through a corresponding armature of relay 17 to an individual conductor 35, leading to an armature 36 of a relay 37, there being nine of these relays 37 included in nine boxes 38, 39, etc., of which the apparatus in box 38 is shown in block diagram, that in the other boxes being identical therewith. If any relay 37 is energized at a particular instant, the corresponding reproducer coil A, B, etc. is, assuming relay 17 to be energized, connected over a corresponding conductor 35, armature 36 and front contact to bus conductor 40 which leads to the right in the figure. In the talking condition the conductor is connected over front contact and armature 41 of relay 18, equalizer 42, amplifier 43, front contact and armature 44 of relay 18 to outgoing line 23. The nine relays 37 are capable of being individually energized momentarily one after another in irregular manner under control of the transmitting commutator 50 in a manner to be disclosed presently. As a result, short portions of the recorded speech as picked up on the reproducers A, B, etc. are transmitted out of their normal order to the outgoing line 23. With relay 18 energized, electromagnet 14 serves as an erasing magnet since its winding is supplied with direct current from battery 45, over armature 59.

In the receiving condition the scrambled speech waves from the distant similar station received over line 24 are transmitted through back contact and armature 27 of relay 16 (key 15 being in this case open), through amplifier 28, armature 29 and back contact, equalizer 51 to the bus conductor 52 which is distributed to the nine boxes 38, 39, etc. containing the switching relays 37. In the receiving condition the coils A, B, etc. serve as recording coils and individual coils are so switched into circuit with the receiving line that the various fragments of the speech which are received in scrambled order are recorded on the tape 10 adjacent one another and in unscrambled or normal order. Continuing the path of the received waves, if at any particular instant the recorder A is to be used, this is connected to the bus conductor 52 by the momentary energization of relay 37, which extends a connection from bus conductor 52 over front contact of relay 37 and armature 53, through low-pass filter 54 to conductor 55, leading through back contact and armature of relay 17 to coil A. The received segment of speech is, therefore, applied momentarily to recorder coil A to make a record on the tape. Simultaneously therewith some of the high frequency current from generator 32 is supplied over armature 33 and back contact of relay 16, over bus conductor 56, over front contact and armature 57 of relay 37, through band-pass filter 58 to conductor 55 and thence to the winding A to serve as a high frequency bias for the purpose of recording the speech on the tape 10. As the other relays in the other boxes 39, etc. are momentarily energized one after another, the speech and the high frequency are sent from the bus conductors 52 and 56, respectively, into the windings of the other recorder magnets B, etc. according as they are selected for use in the unscrambling of the received waves. The band filter suppresses transients of the high frequency produced by relay switching which would otherwise appear in the voice range. The low pass filter prevents relay armature 53 from producing a transient of the high frequency.

As stated, the record produced on the tape 10 by the several coils A, B, etc. in receiving is made up of juxtaposed speech fragments recorded along the wire in their normal relationship. When the record so made passes the pick-up coil 14, therefore, normal speech is reproduced in the coil 14 and is transmitted through normal contact and armature 59 of relay 18, normal contact and armature 41 of relay 18, equalizer 42, amplifier 43, armature 44 and normal contact to conductor 60 leading to telephone receiver 25.

In the receiving condition, coil 13 serves as an erasing coil since it is supplied with direct current from battery 21 over back contact and armature 31 of relay 16.

The nine selector relays 37 are controlled over nine leads making up the conductor group 61 so that any relay 37 may be selectively energized by placing a ground on one of the conductors 61. Such grounds are furnished in the talking condition from the brush 62 of transmitting distributor 50 and in the receiving condition from the brush arm 63 of receiving distributor 70, through contacts controlled by relay 19. Interposed between the distributors and the conductor group 61 are two sets of code relays, the regular set being shown at 64 and the interlace set being shown at 65 each in the form of a block assumed to contain the requisite number of relays and control circuits as more fully disclosed in the Busch et al. application referred to above. The regular code relay group 64 is under the control of the regular scrambler 66 while the interlace group of relays 65 is under the control of the interlace scrambler 67. The purpose of the code relays and scramblers is to scramble the individual conductors between the group 61 and ten individual conductors in the group 71 controlled by code relay group 64 or the individual conductors of the group 72 controlled by code relay group 65. That is, a ground placed on any conductor in the group 71 from one of the two distributors 50 or 70 when traced through the code relay group 64 may emerge as a ground on any one of the nine conductors 61 depending upon the particular setting of the code relays at the moment as determined by the scrambler 66. The same thing is true of a ground placed on a conductor in the group 72 with respect to the operation of the code relay group 65 and conductor group 61.

As more fully explained in the Busch et al. disclosure, the action of a scrambler and its associated group of code relays is such as to distribute the grounds placed on the conductors of the group 71 or 72 among the conductors of the group 61 in as near a random fashion as practicable. The grounds are placed on the conductors of the groups 71 and 72 in the same order in each rotation of the distributors but due to near-random distribution caused by the scramblers and the code relays, these grounds appear on the conductors of the group 61 in an entirely mixed up and haphazard manner.

As further explained in the Busch et al. disclosure, the code relays are set up in cycles under control of timing circuit 75 (this being indicated in FIG. 1 merely in functional manner by the use of leads terminating in arrows 76 and 77 pointing to the code relay groups 64 and 65 to indicate that the timing circuit controls the setting of these relays). The timing is such that the code relays are set up in groups in certain combinations as determined by the scramblers, in advance of their use. In order to permit of continuous transmission or reception without loss of time for setting up the relays in advance, the relays of each set are divided into two groups. Considering, first, code relay group 64, as the brush 62 of transmitting distributor 50 is traversing the first half of its segments, 1 to 10, inclusive, the first group of code relays in group 64 is already operated and locked up to direct the corresponding grounds from the first five conductors of group 71 to various conductors of group 61 and during this time the second group of code relays in group 64 is being selected by the scrambler 66 and set up for use during the time of travel of brush 62 across segments 11 to 20. Only the odd-numbered segments of distributor 50 are connected in the transmitting condition, to conductors in group 71 so that when the brush 62 traverses ten successive segments it has applied ground to only five conductors of the group 71.

The even-numbered segments of distributor 50 are connected in the transmitting condition to the conductor group 72.

Still considering the transmitting condition there will, corresponding to the operation of code relay group 64, be a group of code relays in group 65 previously selected and locked up which direct the grounds placed on the first five conductors of group 72 by the passage of brush arm 62 over even-numbered contacts 2, 4, 6 (etc. to individual conductors of the group 61 and during this time the other group of code relays in the group 65 being selected and operated under control of scrambler 67 to be used when the brush arm 62 traverses the second half of its rotation over conductors 11 to 20.

The timing circuit 75 includes relays that are operated in conjunction with the distributors for controlling the times during which the code relay groups are selected, operated, locked and unlocked to interconnect the various conductors 71 and 72 with the conductors 61 to effect the proper coding or decoding of the speech.

While the apparatus and circuits making up the scramblers and coders and timing circuit 75 are described in detail in the Busch et al. disclosure, enough is given in the drawing of FIG. 1 to show that the timing circuit 75 is operated under control of two segments 80 and 81 associated with the receiving distributor 70. For this purpose the brush arm 63 carries an auxiliary brush which wipes over the timing segments 80 and 81 to supply grounds over the corresponding conductors 82 and 83 leading to the timing circuit 75. As soon as the inner brush carried by arm 63 makes contact with segment 80 or 81, the ground is applied over lead 82 or 83 to initiate a timing cycle in the timing circuit 75. This determines the times at which the relays in one subgroup of group 64 or 65 are restored from their previous locked up condition and are again set up and locked in accordance with the fresh code. This process may conveniently be termed for present purposes "recycling." As already stated, a recycling occurs every half revolution of the distributor brushes. Consequently, the timing segments 80 and 81 are located so that one recycle period starts at the beginning of distributor segment 1 on the receiving distributor 70 and the next recycle period starts at the beginning of segment 11.

As stated, the relay 19 is energized from key 15 during talking, thereby extending through the ten left-hand and ten right-hand front contacts and armatures of this relay the odd-numbered segments of the transmitting distributor 50 to the group 71 and the even-numbered segments to conductor group 72. In the receiving condition relay 19 is deenergized, thereby releasing its armatures to their normal positions and extending conductor groups 71 and 72 to the odd-numbered and even-numbered segments, respectively, of the receiving distributor 70.

A two-way station of the type shown in FIG. 1 can communicate with one or more distant stations of similar equipment. It will be observed from the description thus far given that in transmitting, the speech is recorded in normal order on the tape and is taken off in scrambled order, while in receiving, the speech is unscrambled in the recording process and is taken off by the reproducer 14 in normal order. This operation may be referred to as scrambling on reproduce to transmit and scrambling on record to receive. The advantage of scrambling at one station when reproducing and scrambling at the other station when recording is that identical coding apparatus and identical codes may be used at both stations. Code is here used to mean the order in which the electromagnets A, B, etc. are connected in the circuit. If in both transmitting and receiving the scrambling were done while reproducing from the tape, it would be necessary to connect the electromagnets A, B, etc. in the circuit in accordance with one scheme at one station and in accordance with a complementary scheme at the opposite station in order to code and decode the message. As stated, however, by scrambling while reproducing at one station and scrambling while recording at the other station, the scheme according to which relays A, B, etc. are being connected in circuit at the two distant stations is always the same so that it is only necessary to provide identical scramblers, code relay apparatus and timing circuits at the two stations and to start them and maintain them in exact step with each other at all times in order to permit the continuous coding and decoding to proceed at the two communicating stations and to permit two-way conversation.

The starting of the apparatus at the different stations in step with each other and the maintenance of the apparatus in synchronism may be effected in any suitable manner but the present disclosure assumes for illustrative purposes that the apparatus at each station is operated under control of an oscillator of great constancy of frequency, such as a crystal oscillator indicated in the drawing at 85. Crystal controlled oscillators are known which are temperature compensated and otherwise constructed to maintain a sufficiently constant frequency for perhaps several hours at a time for this purpose. The distributors 50 and 70 are shown as driven from a motor 86 under control of speed control 87 which includes as an element a resonant circuit composed of inductance 88 and capacity 89 which may be supplemented by paralleling other capacities as will be indicated. The motor 86 is connected over two pairs of leads 90 and 91 with the speed control circuit 87 in such manner that a reference frequency generated in the motor is carried over to the speed control circuit 87 through conductors 90 and according as the frequency of the reference wave varies with respect to that of the crystal oscillator 85 a correction is exerted back on the motor over conductors 91 to hold the motor speed constant. A motor speed control suitable for this use is disclosed in a patent application of H. M. Stoller, Serial No. 466,509, filed November 21, 1942 which issued as Patent No. 2,395,517 on February 26, 1946. In this manner the apparatus at separated stations is kept in close synchronism over considerable periods of time without attention. As a station begins to depart from exact synchronism, distortion appears in the received signals indicating that a correction is necessary to restore the proper degree of synchronism. This may be done by throwing the key 92 to the right or the left to find by trial which direction of correction is needed. If the key 92 is thrown to the left, the output of the crystal oscillator 85 is short-circuited at springs 93 and additional condenser 94 is connected in parallel with condensers 89 and 95 by closure of springs 96, thus reducing the resonant frequency of the tuned circuit 88, 89 and causing the motor to tend to slow down. If the distortion observed in the signals disappears after a brief time with the key 92 thrown to the left, this indicates that the proper correction has been made in the phase position of the brushes and the key 92 may be restored to normal. When the key 92 is thrown to the right the crystal oscillator 85 is short-circuited at springs 99 and condenser 95, which is normally connected in the resonant circuit in parallel with condensers 89 due to the normal closure of springs 100, is now removed by the opening of springs 100 due to the closure of springs 101, thereby raising the resonant frequency of the circuit 88, 89 and tending to increase the speed of the motor. If the distortion which was observed disappears with the key 92 thrown to the right, it is known that the proper phase relationship of the apparatus at this station has been restored and the key 92 is restored to normal. If in either of the two actuations of the key 92 as described the distortion should become worse, the key is thrown to the opposite position until the distortion appears.

In the case of distantly separated stations a finite time may be required in the transmission between the two stations and provision is made in the circuit of FIG. 1 for taking account of this transmission time. The receiving distributor 70 has its ring of segments adjustable by means of a worm 105 which may be turned one way or the other to shift the phase position of the segments with respect to the brush arm. Thus, if a receiver is to receive from a distantly operated transmitter over a path having, say, two distributor time units of delay, the worm 105 may be turned to rotate the distributor segments toward the right so that segment 1 is moved up to the position of segment 3 as shown in the figure. This insures that brush arm 63 is coming on to segment 1 of distributor 70 at the instant when the impulse is received which was transmitted under control of segment 1 of the transmitting distributor of the distant station. The timing segments 80 and 81 are also rotated along with the distributor segments so that recycling time, as far as the receiver is concerned, is proper for the reception and decoding of the signals.

This movement of the receiving distributor ring to correct for transmission delay in one direction over a circuit of assumed finite transmission delay would, however, retard the recycling time for transmitting in the opposite direction, if only timing segments 80 and 81 are used. It will be noted that the timing segments 80 and 81 may be effectively lengthened by connecting in parallel with them auxiliary segments 102 and 103. These segments are effective, however, only when the relay 20 is energized and, therefore, when the station is in talking or transmitting condition. The effect of connecting these auxiliary segments to the circuit is that the recycling time for transmitting is advanced, since the inner brush on arm 63 now applies ground to conductors 82 and 83 of the timing circuit 75 at an earlier time in the cycling. This provides, therefore, for initiating the recycling when talking at an earlier point in the cycle.

Figure 2:
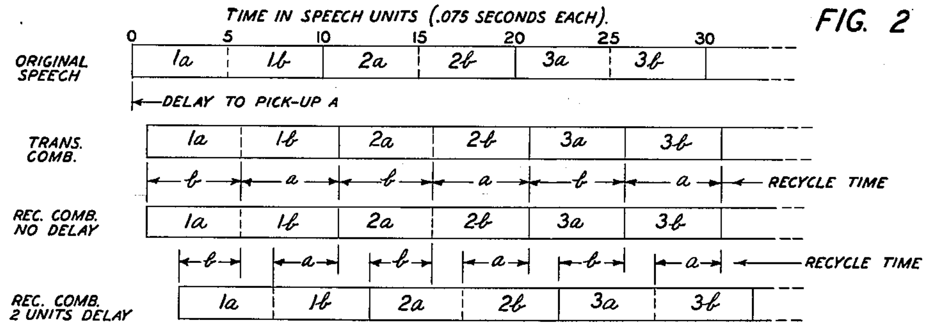
FIG. 2 is a diagram to aid in understanding certain time relations to be described.

The reason for the provision of the auxiliary segments 102 and 103 is illustrated by the diagram in FIG. 2 where time is measured toward the right in speech units each of .075 second duration. The upper row of blocks labeled "original speech" shows that five units of speech are recorded on the tape in an interval designated as $1a$ and that the next five units are recorded on the tape in an interval designated as 1*b*. Assuming that one speech unit of time separates the recorder 13 from the first pick-up magnet A, the second horizontal row of rectangles labeled "transmitting combination" shows the time units elapsed after the recorded speech reaches pick-up point A. In the interval 1*a* when the first five speech units of a particular transmitting combination are being transmitted, the second group of code relays is being set up so that if the first half of a ten-unit group is designated as *a* and the second half as *b*, the *b* group is being recycled while the *a* group is being transmitted. This is shown by the letters in the line opposite "recycle time." If there were no transmission delay at all, the receiving combination would have the same timing as the transmitting combinations, the *a*'s and *b*'s of the different code cycles lying directly under each other in the diagram. The lowest row of rectangles assumes, however, a transmission delay of two units in which case the receiving combinations are not received until two units later than the sending of the transmitting combinations. If the auxiliary segments 102 and 103 were not used in the receiving distributor, the recycling time for transmitting in the opposite direction would be shortened as indicated by the shortened segments in the lower recycle time indicated in the diagram. This is seen from the fact that the transmission delay for both directions of transmission is compensated for in the receiver at each station. This means that the transmitting distributors of both stations are in the same position and start their transmitting cycles at the same time. Referring to the diagram of FIG. 2, therefore, the transmitting time at both stations is given by the second row of rectangles labeled "transmitting combination." If, however, the recycling times for setting up the *b* relay group do not begin until later times as indicated in the case assuming two-units transmission delay, there may be insufficient time to accomplish the setting up of the relay group before it is to be used for transmission. By providing the extra timing segments 102 and 103, however, the recycling time can be made to correspond with the operation of the transmitting distributor 50 even though the phase position of the receiver-distributor 70 of the same station has been rotated to the right as assumed.

Figure 3:
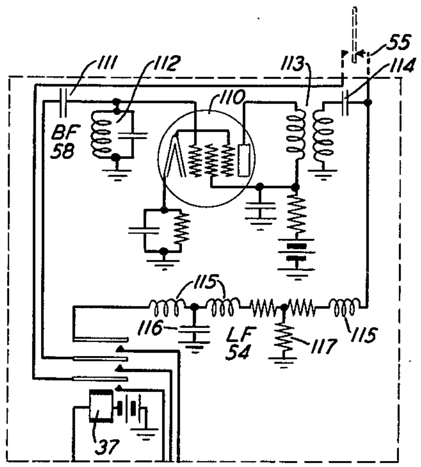
FIG. 3 is a circuit diagram of a detail of the system of FIG. 1.

Referring to FIG. 3, a detail showing of the circuit that may be included in one of the boxes 38, 39, etc. of FIG. 1 is shown. Here the interconnection between the output side of the high frequency filter 58 and the low frequency filter 54 is made with the aid of a vacuum tube 110 shown as a pentode. The high frequency band filter 58 for supplying the 20-kilocycle waves comprises a capacity 111 and an antiresonant circuit 112 connected in the grid circuit of the tube 110 and together made highly selective to the 20-kilocycle frequency. This frequency is transmitted through the tube 110 and through the output transformer 113 and small condenser 114 to conductor 55 leading to a back contact and armature of relay 17 shown in dotted lines in this figure. The low pass filter 54 comprises series inductances 115 and shunt capacity 116 connected in series with a pad 117 directly to conductor 55. In this way the high frequency waves and the speech waves may be applied to conductor 55 without mutual interference.

Figure 4:
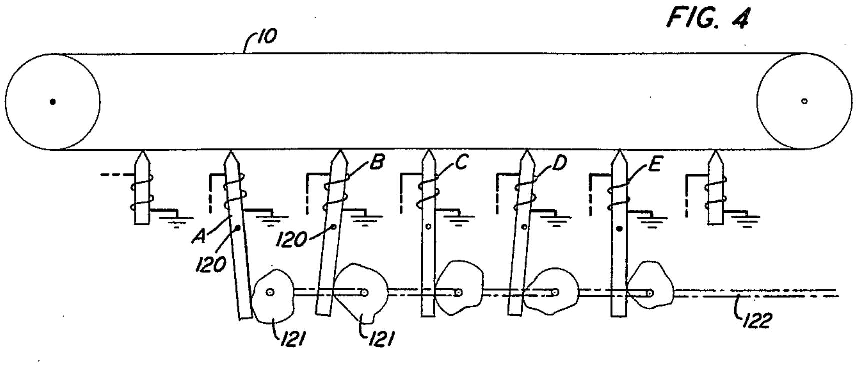
FIG. 4 is a sketch of a modification of a part of the apparatus of FIG. 1.

In FIG. 4 a modification is shown for introducing additional distortion in the speech waves as they are recorded on or reproduced from the tape 10. In this case the various recorder-reproducer magnets A, B, etc. (of which only five are shown for simplicity) are mounted on pivots 120 so that their recording points may be swung to the right or left in the figure under control of a series of cams 121 all driven from the same drive shaft 122. The motion of the shaft 122 is such that one complete revolution of all of the cams 121 is made during the transmission or the reception of a single speech unit, that is, during the time of energization of relay 37 which is in turn the same as the time of transit of the distributor brush over one segment. At the beginning of each speech unit the reproducer magnets are all in exactly vertical position and they return to this same position at the end of each such unit. This simplifies the coordination that needs to be made between the movements of the magnets at the several stations and leaves as the only other requirement that the cams be of the same shape at the different stations. The relative movement of the magnets with respect to the tape 10 introduces frequency variations into the transmitted speech elements, thus making them more difficult to recognize and understand.

What is claimed is:

1. In a privacy system, a magnetic signal recording medium, a succession of electromagnets cooperatively related to said medium to record signals thereon or reproduce signals therefrom, signal transmitting and signal receiving means, signal coding mechanism for coding signals to be sent and decoding received signals, means for alternatively conditioning said electromagnets for connection to said signal transmitting or to said signal receiving means in sequences determined by said coding mechanism, and means operative when said electromagnets are conditioned for connection to one only of said signal transmitting or signal receiving means to condition said electromagnets to produce a record on said medium, including a source of bias waves, and means to supply said bias waves to said electromagnets.

2. In a speech privacy system, a traveling magnetic tape, recorder electromagnets spaced along said tape, a signal circuit, means for connecting said electromagnets to said signaling circuit one at a time in irregular order to enable them to record signal elements on said tape, a source of high frequency waves having a frequency higher than any frequency present in said signals, and means to apply high frequency waves from said source to the individual electromagnets simultaneously with connection of the latter to said signaling circuit.

3. In a speech privacy system, a traveling magnetic tape, recorder electromagnets spaced along said tape, a signal circuit, individual switches for connecting respective electromagnets to said signaling circuit, a source of high frequency bias waves, scrambler mechanism for actuating said switches in irregular order to connect said electromagnets to said signaling circuit, said switches when so actuated also connecting said source of high frequency waves to said electromagnets.

4. A two-way telephone privacy terminal comprising a speech input and speech output circuit, and an output circuit and an input circuit for scrambled speech, a traveling magnetic tape, a plurality of electromagnets spaced along said tape for recording thereon or reproducing therefrom, means controlling connection of said electromagnets alternately to an input circuit and to an output circuit according as speech is being transmitted in one direction or another with respect to said terminal, said electromagnets when connected to one only of said circuits serving as recording electromagnets for making a magnetic record on said tape, means controlling connection of said electromagnets individually in irregular order to respective input or output circuit and means controlled in the operation of said last means for applying a high frequency bias wave to said electromagnets at such times and only at such times as said individual electromagnets are serving as recording electromagnets.

5. In a two-way telephone privacy terminal, a traveling magnetic tape, a succession of electromagnets spaced along said tape at intervals, means for using said electromagnets to record speech fragments on said tape during transmission of secret telephony in one direction with respect to said terminal and to reproduce recorded speech fragments from said tape during transmission in the opposite direction with respect to said terminal, scrambling means for selecting said electromagnets individually for use one at a time as recorders or reproducers, a source of high frequency bias waves and means to apply bias waves from said source to elected individual electromagnets during only such times as they are used for recording.

6. A system according to claim 3 including a receiver for receiving the waves recorded on said tape and band-pass filters connected between said source and said recorder electromagnets to allow said high frequency waves to be applied to said electromagnets but to suppress transients arising from the switching of said high frequency waves that might cause clicks in said receiver.

References Cited in the file of this patent

UNITED STATES PATENTS

| | | |
|---|---|---|
| 1,326,574 | Nichols | Dec. 23, 1919 |
| 1,605,023 | Hartley | Nov. 2, 1926 |
| 1,676,321 | Carpe | July 10, 1928 |
| 1,809,070 | Schapiro | June 9, 1931 |
| 2,094,132 | Miller | Sept. 28, 1937 |